(12) United States Patent
Kanemitsu

(10) Patent No.: US 6,499,051 B1
(45) Date of Patent: Dec. 24, 2002

(54) INFORMATION TRANSMISSION METHOD AND DEVICE

(75) Inventor: Hiroyuki Kanemitsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/246,151

(22) Filed: Feb. 8, 1999

Related U.S. Application Data

(63) Continuation of application No. PCT/JP97/02730, filed on Aug. 6, 1997.

(30) Foreign Application Priority Data

Aug. 28, 1996 (JP) .............................. 8-226352

(51) Int. Cl.$^7$ ................................. C06F 7/00
(52) U.S. Cl. ...................... 709/203; 709/206
(58) Field of Search .................. 455/414; 701/203; 709/200, 202, 206

(56) References Cited

U.S. PATENT DOCUMENTS

| | | | |
|---|---|---|---|
| 4,251,865 A | 2/1981 | Moore et al. ............... | 710/109 |
| 4,797,948 A | 1/1989 | Milliorn et al. ........... | 340/10.52 |
| 5,172,321 A | 12/1992 | Ghaem et al. .............. | 455/456 |
| 5,182,555 A | 1/1993 | Sumner ..................... | 340/905 |
| 5,258,739 A | 11/1993 | DeLuca et al. ............. | 340/7.52 |
| 5,339,400 A | 8/1994 | Iijima ........................ | 711/115 |
| 5,420,794 A | 5/1995 | James ......................... | 701/117 |
| 5,426,513 A * | 6/1995 | Scorse et al. ............... | 358/433 |
| 5,444,438 A | 8/1995 | Goldberg ................... | 340/7.23 |
| 5,444,444 A | 8/1995 | Ross .......................... | 340/994 |

(List continued on next page.)

FOREIGN PATENT DOCUMENTS

| | | | | |
|---|---|---|---|---|
| JP | 2-307137 | 12/1990 | | |
| JP | 3-279999 | 12/1991 | | |
| JP | 5-53503 | 3/1993 | | |
| JP | 5-265376 | 10/1993 | | |
| JP | 6-6350 | * 1/1994 | ........... | G06F/13/00 |
| JP | 6006350 | * 1/1994 | ........... | G06F/13/00 |
| JP | 6-78075 | 3/1994 | | |
| JP | 6-141045 | 5/1994 | | |
| JP | 6266760 | * 9/1994 | ........... | G06F/13/00 |
| JP | 7-21211 | 1/1995 | | |
| JP | 7-262102 | 10/1995 | | |
| JP | 8-97854 | 4/1996 | | |
| JP | 8-185375 | 7/1996 | | |
| JP | 8-214373 | 8/1996 | | |

OTHER PUBLICATIONS

Shrikumar, H. et al., "Thinternet: life at the end of a tether" Computer Networks and ISDN Systems, vol. 27, No. 3 (1994) pp. 375–385.
Patent Abstracts of Japan, vol. 1995, No. 4 (1995) Abstract.
Shrikumar, "Thinternet: life at the end of a tether", Computer Networks, 1994, pp. 375–385.

*Primary Examiner*—N. Le
*Assistant Examiner*—Walter Benson
(74) *Attorney, Agent, or Firm*—Pillsbury Winthrop LLP

(57) ABSTRACT

An information transmission method and device for preventing a client from getting an impression that they are being kept waiting for a response, even when the go response contains a large amount of data. A search request is made from an information communication system of a vehicle, an information providing center receives the request, and searches a database to obtain a search result. If the search result contains data of more than one data type such as texts and images, a data group is formed for each data type and the amount of data for each data group is calculated. Transmission order is determined by arranging the data groups in an ascending order of data amount from smallest to largest. The transmission order is further determined for each data group by arranging data in an ascending order from smallest to largest, and data is transmitted to the vehicle in this order.

12 Claims, 8 Drawing Sheets

U.S. PATENT DOCUMENTS

| | | | |
|---|---|---|---|
| 5,463,382 A | 10/1995 | Nikas et al. | 340/7.22 |
| 5,544,061 A | 8/1996 | Morimoto et al. | 701/202 |
| 5,621,888 A * | 4/1997 | Botzenhardt et al. | 714/52 |
| 5,642,365 A * | 6/1997 | Murakami et al. | 714/761 |
| 5,648,769 A | 7/1997 | Sato et al. | 340/988 |
| 5,751,969 A | 5/1998 | Kapoor | 709/200.235 |
| 5,754,754 A * | 5/1998 | Dudley et al. | 714/761 |
| 5,974,441 A * | 10/1999 | Rogers et al. | 709/200 |
| 5,974,447 A | 10/1999 | Cannon et al. | 709/206 |
| 6,049,711 A * | 4/2000 | Ben-Yehezkel et al. | 455/414 |
| 6,073,075 A * | 6/2000 | Kondou et al. | 701/203 |
| 6,092,099 A * | 7/2000 | Irie et al. | 709/202 |
| 2001/0055514 A1 * | 12/2001 | Ishida et al. | 710/220 |

* cited by examiner

| INFORMATION | TEXT DATA | IMAGE DATA | AUDIO DATA |
|---|---|---|---|
| A | at | ai | av |
| B | bt | bi | bv |
| C | ct | ci | cv |
| D | dt | di | dv |

Fig. 5

INFORMATION TRANSMISSION METHOD AND DEVICE

This is a continuation of International Appln. No. PCT/JP97/02730 filed Aug. 6, 1997 which designated the U.S.

BACKGROUND OF THE INVENTION

1. Field of the Invention

The present invention relates to information transmission method and device for obtaining a search result (information) of more than one data type to respond to a request from a client.

2. Description of the Related Art

In recent years, various types of on-line information provider systems are available. An information provider system including an information providing center for providing information to an on-vehicle navigation system and the vehicle is one such example. Receiving a request from a vehicle for transmission of certain information, the information providing center searches its own database for the requested information and transmits a response to the request. Recent navigation systems can handle information such as news and advertising in addition to information on maps and route guidance. While responding to some transmission requests, such as a request for a road map around a destination, requires only one item of information, more than one item of information may be simultaneously needed to respond to other requests, such as a request for information on restaurants near a certain station A. The information providing center is usually formed by a server system equipped with a variety of databases for providing information so as to respond to clients' requests for transmission of a variety of information. However, as the center may not store all the required information, it may have access to an external database system so as to retrieve information to be supplied as a response.

Search requests made from a vehicle to the information providing center include those for detailed maps covering a destination, news, information on facilities (location, services provided, and so on) the client wishes to use, and the like. When receiving a request to search for "restaurants in a certain area", for example, the information providing center searches the database for information on the restaurants of interest, and responds by sequentially transmitting the search results. The information on restaurants generally includes the address, telephone number, introduction articles, location, and photos of the restaurants showing their appearance. Such information is in the form of text, image, or audio data, or combination thereof, supplied from the information providing center.

At the vehicle, data transmitted from the information providing center can be sequentially presented at its display, or the information can be monitored with speech output. FIG. 8 schematically shows an example of a display showing information on restaurants.

Conventionally, however, the information providing center simply transmits search results in order, regardless of the amount of each piece of information in a response. If the information providing center first transmits a large amount of data to a vehicle, the data cannot be immediately presented on an on-vehicle display. In other words, clients (such as users of a mobile terminal on a vehicle or the like) feel that they are being kept waiting because a long time period is required for display of the data. If image data or the like is first transmitted, the users ay strongly feel that they are being kept waiting, whereby the users wonder if there is something wrong with a communication channel.

SUMMARY OF THE INVENTION

The present invention has been conceived to solve the above problem, and an object thereof is to provide an information transmission method and device for preventing, as much as possible, a client from getting an impression that they are being kept waiting, even if a large amount of data is contained in a response.

In order to achieve the above object, an information transmission method for a server to transmit a response to a client's request for information transmission according to a first aspect of the present invention includes the steps of: identifying the type of data in the response; obtaining the amount of transmitted data for each data type in the response; controlling the order of data transmission based on the thus obtained amount of transmitted data for each data type; and transmitting the response in the data transmission order set by the above step of controlling the data transmission order.

An information transmission method for an information providing center to transmit a response to a request from a vehicle for information transmission according to a second aspect of the present invention includes the steps of: identifying the type of data in the response; obtaining the amount of transmitted data for each data type in the response; controlling the order of data transmission based on the thus obtained amount of transmitted data for each data type; and transmitting the response in the data transmission order set by the above step of controlling the data transmission order.

According to a third aspect of the present invention, the step of controlling the transmission order in the information transmission method of the above first or second aspect includes the step of sequentially arranging data in an ascending order so that the data of the type having the smallest data amount is put first in order.

According to a fourth aspect of the present invention, the step of controlling the transmission order in the information transmission method of the above first or second aspect includes the step of sequentially arranging data of a type in an ascending order so that the data having the smallest amount is put first in order among the data of that data type when a plurality of data items are contained in the data type.

According to a fifth aspect of the present invention, the information transmission method of the above first or second aspect further includes a step of dividing search results into units when a plurality of search results are included in a response, and the step of controlling the transmission order includes the step of determining data transmission order for each unit.

According to the above aspects, regardless of the order of search requests or search results (information) obtained by searching databases, data is arranged in an ascending order of the data amount for each data type and, when a plurality of data items are included in a data type, data is further arranged in an ascending order of the data amount for each type or unit so that data with the smallest amount is first transmitted. Since information is transmitted in the above manner, a client receiving the information does not feel that they are being kept waiting because the information begins appearing shortly after a search request is made.

According to a sixth aspect of the present invention, the above step of controlling the transmission order in the first or second aspect includes the step of dividing search operations into groups based on databases when a plurality of databases should be searched to obtain a response so as to control the data transmission order for each group. By thus performing a search on the basis of databases, overhead accompanied with switching databases is reduced, contributing to a reduction in time for retrieval of requested information. As a result, a client receiving the information does not feel kept waiting because he/she can receive the information more shortly after making a search request.

Especially, the method according to the second aspect which prevents a client from feeling kept waiting is very advantageous for a person on board because the person, who waits for the information in a vehicle that is relatively small in terms of space while moving to a destination or the like, would feel there is a longer wait relative to a general server system.

Further, an information transmission device according to the present invention includes means for implementing the information transmission method according to the above aspects.

BRIEF DESCRIPTION OF THE DRAWINGS

FIG. 5 shows an example of how data of respective types forms a search result (information) according to the second embodiment.

BRIEF DESCRIPTION OF PREFERRED EMBODIMENTS

Preferred embodiments of the present invention will next be described with reference to the attached drawings.

First Embodiment

Figure 1:
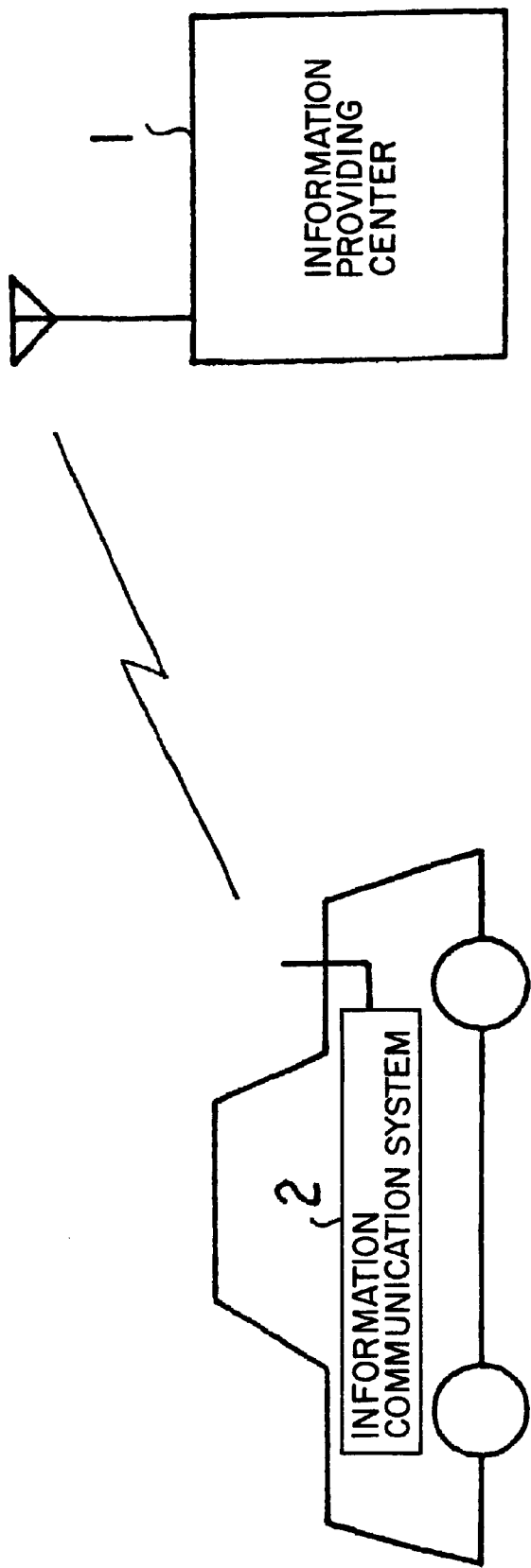
FIG. 1 schematic diagram showing an overall arrangement of one embodiment of a client-server type information provider system employing an information communication method of the present invention.
Figure 2:
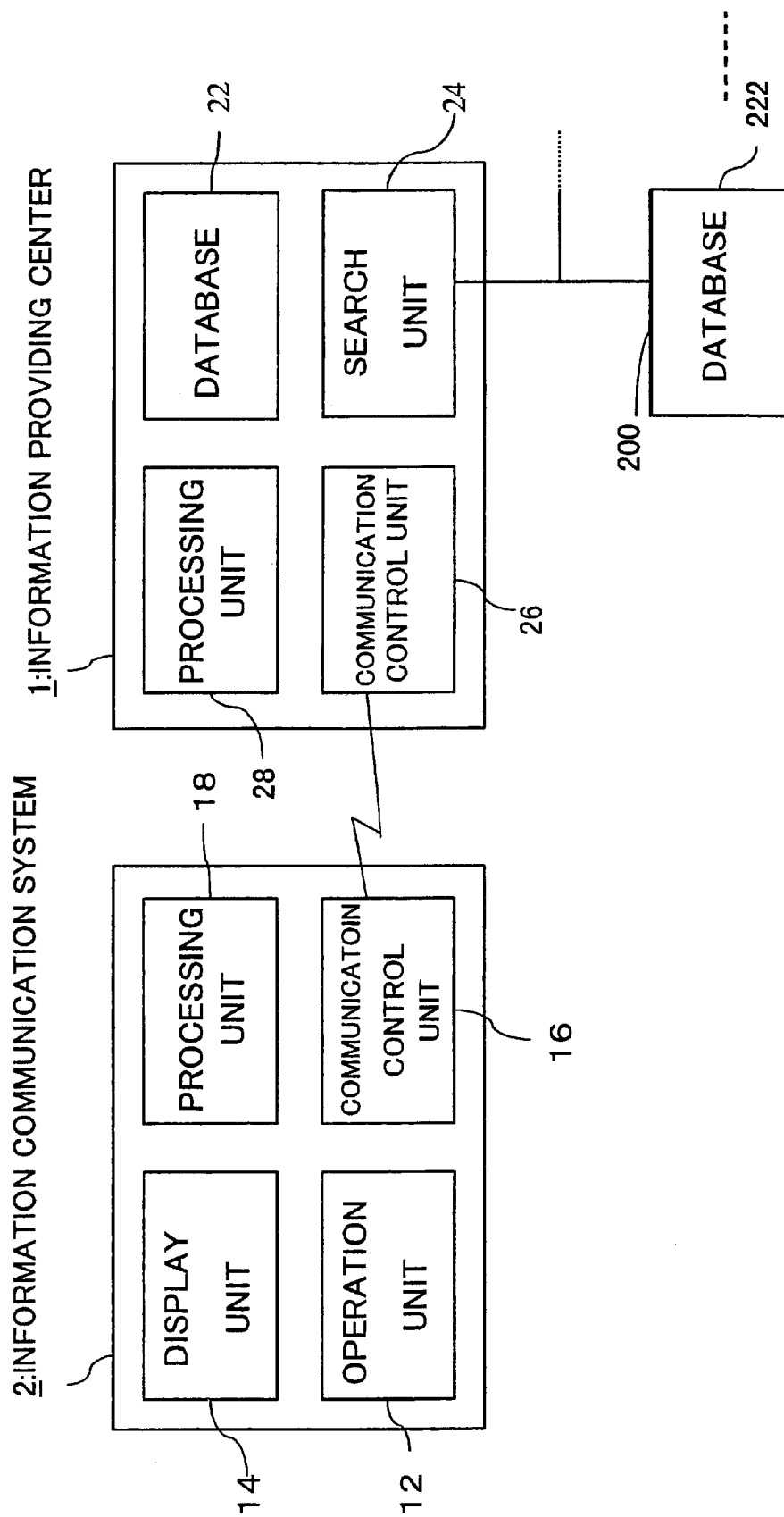
FIG. 2 a block diagram showing configurations of a vehicle and an information providing center forming the information provider system according to the first embodiment.

FIG. 1 is a schematic diagram showing an overall arrangement of an information provider system of a client-server type employing an information communication method according to one embodiment of the present invention. This embodiment is described in the context of a system for providing a vehicle with information as shown in FIG. 1. FIG. 2 is a block diagram showing the arrangement of the system in FIG. 1. An on-vehicle information communication system 2 corresponding to the previously described navigation system is a server system which can retrieve such information as news in addition to map and route guidance information. The information communication system 2 includes an operation unit 12 for entry of details of a search request made to the information providing center 1, a display unit 14 for displaying information supplied from the information providing center 1, a communication control unit 16 for communicating information with the center 1, and a processing unit 18 for performing control operations on the entire information communication system. Usually, the display of a touch panel type forming the display unit 14 is also used as the operation unit 12.

On the other hand, the information providing center 1 is a server system for transmitting a response to a request for information made from the information communication system 2. The center 1 includes a database 22 where information is stored, a search unit 24 for performing search operations on the database 22 in response to the received search request, a communication control unit 26 for communicating information with the system 2, and a processing unit 28 for performing control operations on the entire information providing center. When the requested information is not held in the information providing center 1, the search unit 24 accesses to an external database 222 possessed by another database system 200 so as to obtain necessary information.

A characteristic feature of this embodiment lies in that data of the type having the smallest data amount is transmitted first when a plurality of data types are included in a response. By transmitting data in an ascending order of data amount, the time from when a person on board makes a search request to when the first piece of information is presented, can be reduced to the shortest possible value, so that an impression of being kept waiting can be prevented as much as possible.

Figure 3:
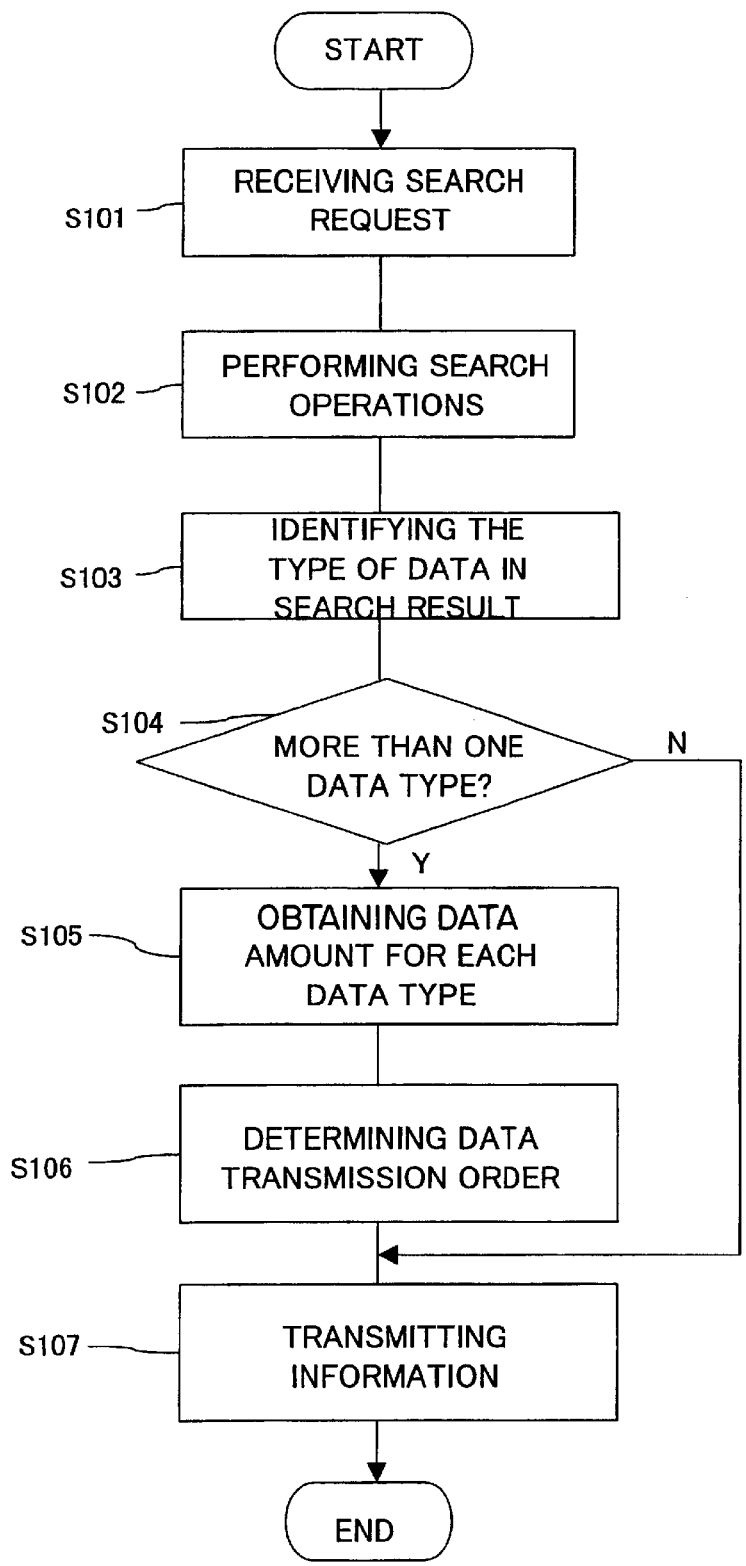
FIGS. 3 and 4 are flowcharts showing the steps of the information communication methods according to the first and second embodiments, respectively.

The steps of the information communication method according to this embodiment will next be described with reference to the flowchart shown in FIG. 3.

When a search request, that is, a request for transmission of information is issued from a vehicle, the information providing center 1 receives the search request (step 101), performs search operations on the database 22 and the like, and obtains the information of interest (step 102) to respond to the request. If necessary information cannot be found in the database 22, the search unit 24 shifts to search operations on another database 222. Such search operations on external databases will not be described herein unless mentioned because this is not a characteristic feature of the present invention. It is now assumed that only one search result to be supplied as a response is obtained from search operations by the search unit 24. This one search result may contain data of a plurality of types, such as information for a restaurant containing map information represented by image data, and the location, introduction, and the like represented by text data. Therefore, according to this embodiment, each of the data types included in the information supplied as a response is identified (step 103) before it is transmitted to the vehicle. If it is determined that a response contains a plurality of data types (step 104), the amount of data is calculated for each data type (step 105). When information on a restaurant consists of text and image data, the amount of data of each data type is calculated. According to this embodiment, data is put in an ascending order of data amount so that data with the smallest amount comes first (step 106), and is sequentially transmitted (step 107)In other words, the data is put in a transmission queue in the ascending order of data amount. If the data is of a single type, the information is simply transmitted (steps 104 and 107).

Thus, according to this embodiment, when one search result contains data of plural types, the data is retrieved from the database 22 to be temporarily stored, arranged and transmitted in an ascending order of data amount; the data is not transmitted in the order of readout, i. e. retrieval, or temporary storage for transmittance. As a result, the client does not feel that he/she is kept waiting because the time period required for acquiring and displaying information after making a search request is reduced. More specifically, if one response includes, for example, text information with a small data amount and image information with a large data amount and the information providing center 1 first transmits image information, a person aboard must wait a long time before the image information is received and the image is displayed.

On the other hand, when the text information with a smaller data amount is first transmitted, the person aboard need only wait for a relatively short time before the text information is displayed because it can be received in a shorter time than the image information. While the person aboard looks at the text information, the image data with a large data amount is received and then sequentially displayed. This effect is conspicuous especially when data having a large data amount, such as image data, is included in a response. It will be understood that image data is transmitted first when it has smaller data amount than text data because this embodiment is characterized in that data with the smallest amount is given the first priority for transmittance as a response.

As apparent from the above description, a characteristic feature of this embodiment lies in processes conducted at the information providing center and no special configurations or processes are necessary for vehicles.

Second Embodiment

Figure 4:
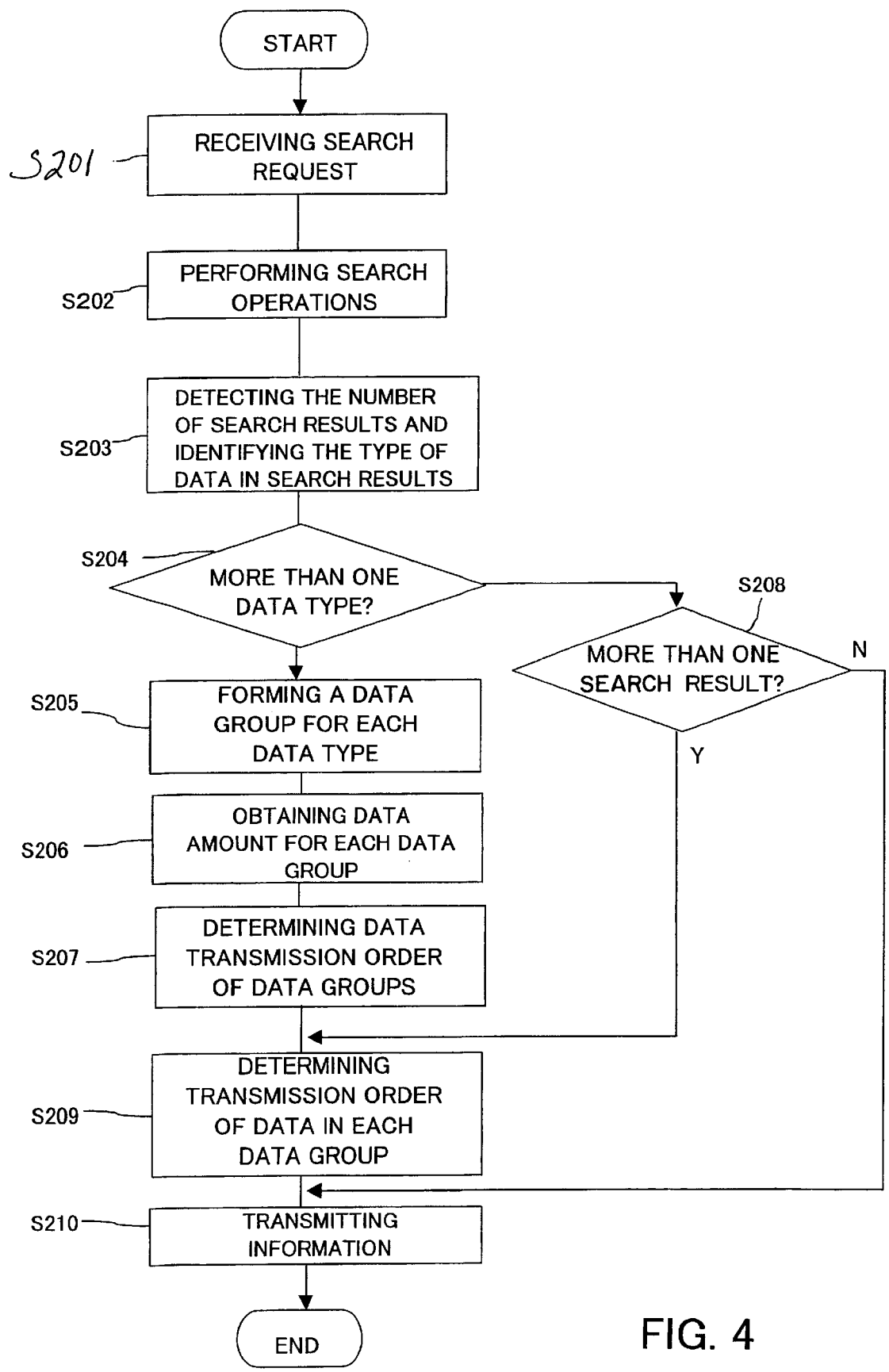

The above first embodiment was described in connection with an information transmission method used for the case where only one search result is obtained for a search request. A second embodiment is described with reference to the flowchart in FIG. 4, taking into consideration a case where a plurality of search results are obtained. Configurations of the device in this and other embodiments described hereinafter correspond to that of the first embodiment.

When a search request or an information transmission request is made from a vehicle, the information providing center 1 receives this search request (step 201) and, to respond to the request, performs search operations on database 22 and the like to obtain information of interest (step 202). As described above, one or more search results may be obtained by the search unit 24 from search operations. The number of search results and the data types included in all the search results are first detected (step 203).

If the detection result indicates a plurality of data types, data is divided into groups for each data type (steps 204 and 205). For example, when search results, i. e. information, A, B, C, and D are obtained as shown in FIG. 5, three data groups of text data (at, bt, ct, and dt), image data (ai, bi, ci, and di), and audio data (av, bv, cv, and dv) are formed. This step is performed regardless of the number of search results. Thus, when information A is the only search result obtained, three data groups of text, image, and audio data are formed containing data "at, ai, and av," respectively, resulting in substantially the same operations as that in the first embodiment. The amount of data is next calculated for each data group (step 206). The data amount of, say, text data group is obtained by calculating the sum of "at, bt, ct, and dt" altogether. The order of transmission is determined by arranging data groups in an ascending order of data amount (step 207) and further arranging data in each data group in an ascending order of data amount (step 209). When, for example, respective data amounts in the text data group stand at "at>bt>ct>dt", the data is transmitted in the order of "dt, ct, bt, and at". Thus, the order of transmitting all the data in search results is determined and the data is transmitted in sequence (step 210).

If only a single search result that consists of a single data type is obtained, such as a case where information A is the only search result consisting only of text data "at", arrangement of data is not necessary and therefore the data is transmitted without any arrangement steps (steps 204, 208, and 210). If a plurality of search results which are of a single data type are obtained, such as a case where each of the search results A, B, C, and D consists only of text data "at, bt, ct, and dt," respectively, pieces of data in the text data group are arranged in an ascending order of data amount and sequentially transmitted (steps 204, 208, 209, and 210).

Thus, according to this embodiment, similar effects to those described in connection with the above first embodiment can be obtained by the above-described arrangement processes, even when a plurality of search results are obtained and a plurality of data types are contained therein. According to this embodiment, when information on a plurality of restaurants can be displayed at the on-vehicle display unit 14, text information on restaurants is first transmitted and displayed at the display unit 14. While the client takes a look at the text information, image data with relatively large data amount is transmitted so that photographs, map information, and the like are displayed thereafter. Thus, all the text information on restaurants is transmitted first to be presented at the display, so that the client does not feel that he/she is kept waiting even though the map information or the like has yet to be displayed.

Third Embodiment

In the above second embodiment, the information providing center 1 first transmits data with small data amount, such as text data, collectively when the on-vehicle display unit 14 simultaneously displays more than one item of information. However, display area of the display unit 14 is limited and therefore the amount of information that can be simultaneously displayed is also limited. When the number of search results are greater than the number (N) of pieces of information that can be displayed at a time, the search results are commonly divided into units each consisting of N results, so that information is displayed on unit-by-unit basis. Therefore, even if the amount of data in the whole text data group included in search results is smaller than that in the other groups, the text data group in a unit does not necessarily have the smallest data amount.

The characteristic feature of this embodiment therefore lies in that, when a plurality of search results are obtained, these results are divided into units and the amount of data for each data group is calculated on unit-by-unit basis so that data with the smallest amount is transmitted first as described above.

Figure 6:
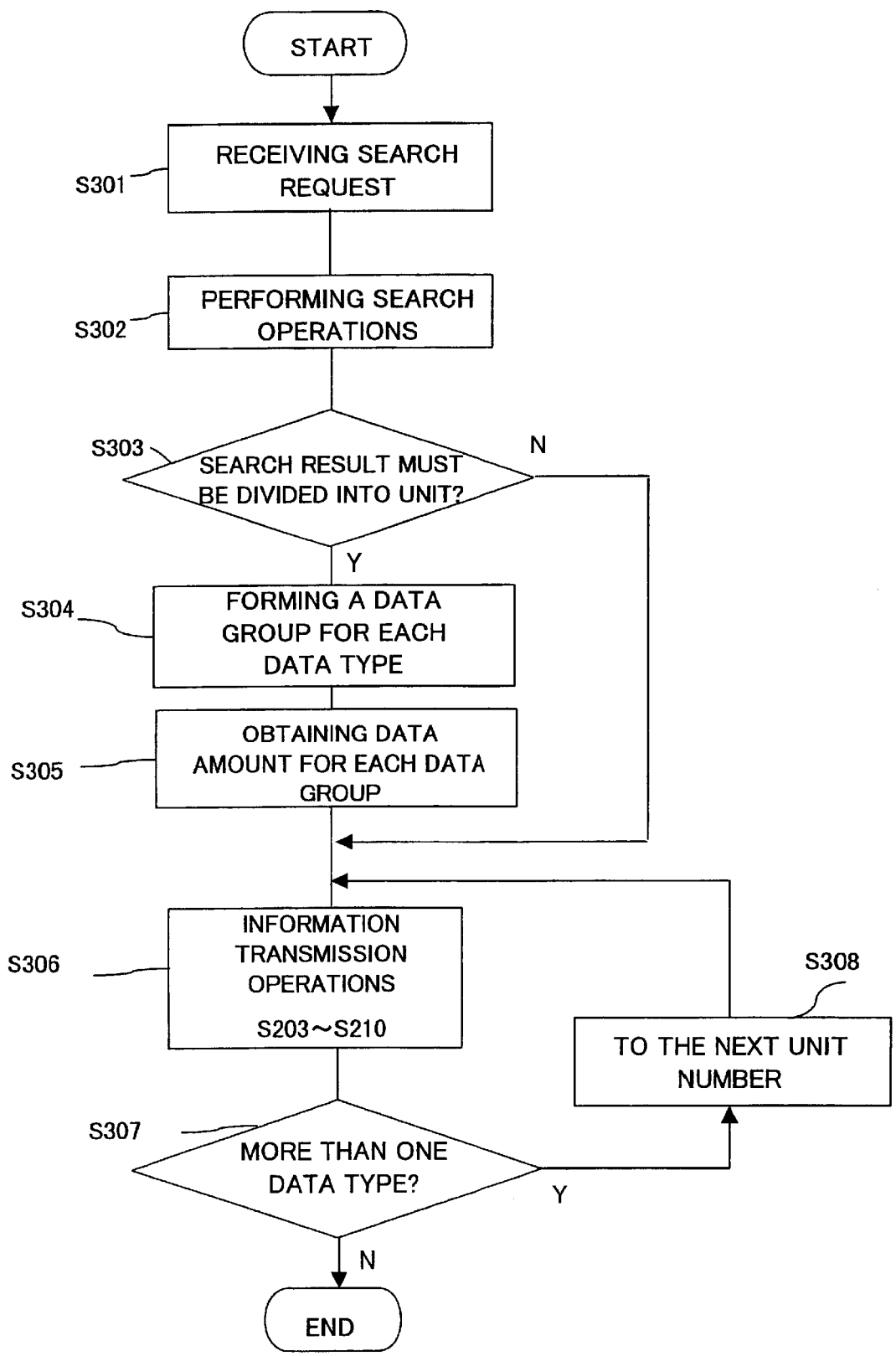
FIGS. 6 and 7 are flowcharts showing the steps of the information communication methods according to the third and fourth embodiments, respectively.

Steps taken in accordance with an information transmission method of this embodiment will be described below with reference to the flowchart shown in FIG. 6.

When a search request, i. e. a request for information transmission, is made from a vehicle, the information providing center 1 receives the search request (step 301). In order to respond to this request, the center 1 performs search operations on database 22 and the like to obtain information of interest (step 302). Assuming that four pieces of information can be presented simultaneously at the on-vehicle display unit 14 (N=4) and five or more search results are obtained, the search results are divided into units each consisting of four results because not all of the search results can be simultaneously displayed (steps 303 and 304). It should be noted that the last unit may include less than four search results. For each unit, steps of data arrangement and information transmission described in connection with the second embodiment (steps 203–210 in FIG. 4) are performed (steps 305 and 306), and these processes are conducted for each unit (steps 307 and 308).

At the vehicle, the data necessary for the first display, i. e. the first unit, can be obtained more rapidly because the transmitted information is divided into units and information with the smallest data amount in each unit is transmitted first, whereby the client does not feel kept waiting for information to be displayed after making a search request. While the person on board refers to the first text information, image data to be presented on the first display, i. e. image data in the first unit, is received, followed by reception of information to be displayed on the next display and so on.

As described above, according to this embodiment, all search results are divided into the smallest possible number of units in order to display information before data groups are arranged in order, and information is transmitted unit by unit. Consequently, information can be displayed in a reduced time, so that the client does not feel that he/she is kept waiting for information.

A characteristic feature of this embodiment lies in that search results are divided into units and that the data with the smallest amount in each unit is transmitted first. While this embodiment is described in the context of a case where the pieces of information simultaneously displayable is handled as a unit, division into units can be based on other limitations such as the amount of memory at the vehicle, the amount of data transfer blocks, and communication protocol, which is embraced within the scope of the present invention.

Fourth Embodiment

In the above-described third embodiment, data is divided into units based rather on the specification of transmission or display of information. According to this embodiment, data is divided into units taking into consideration the speed at which the information providing center 1 performs search operations. More specifically, according to this embodiment, when a search request requires retrieval of more than one item of information from more than one database, search operations are divided into units for each database so as to reduce overhead due to switching databases.

Figure 7:
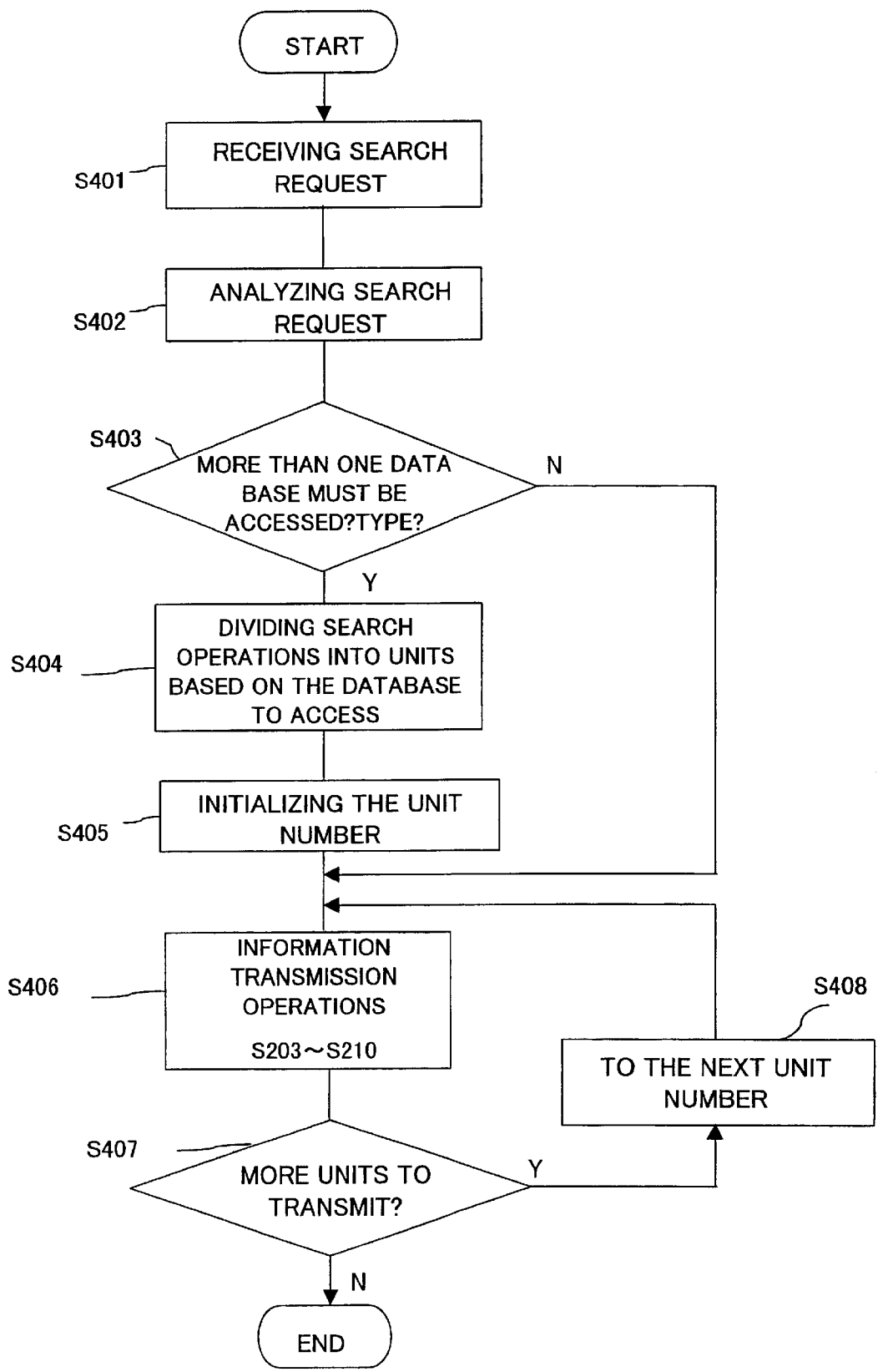
Figure 8:
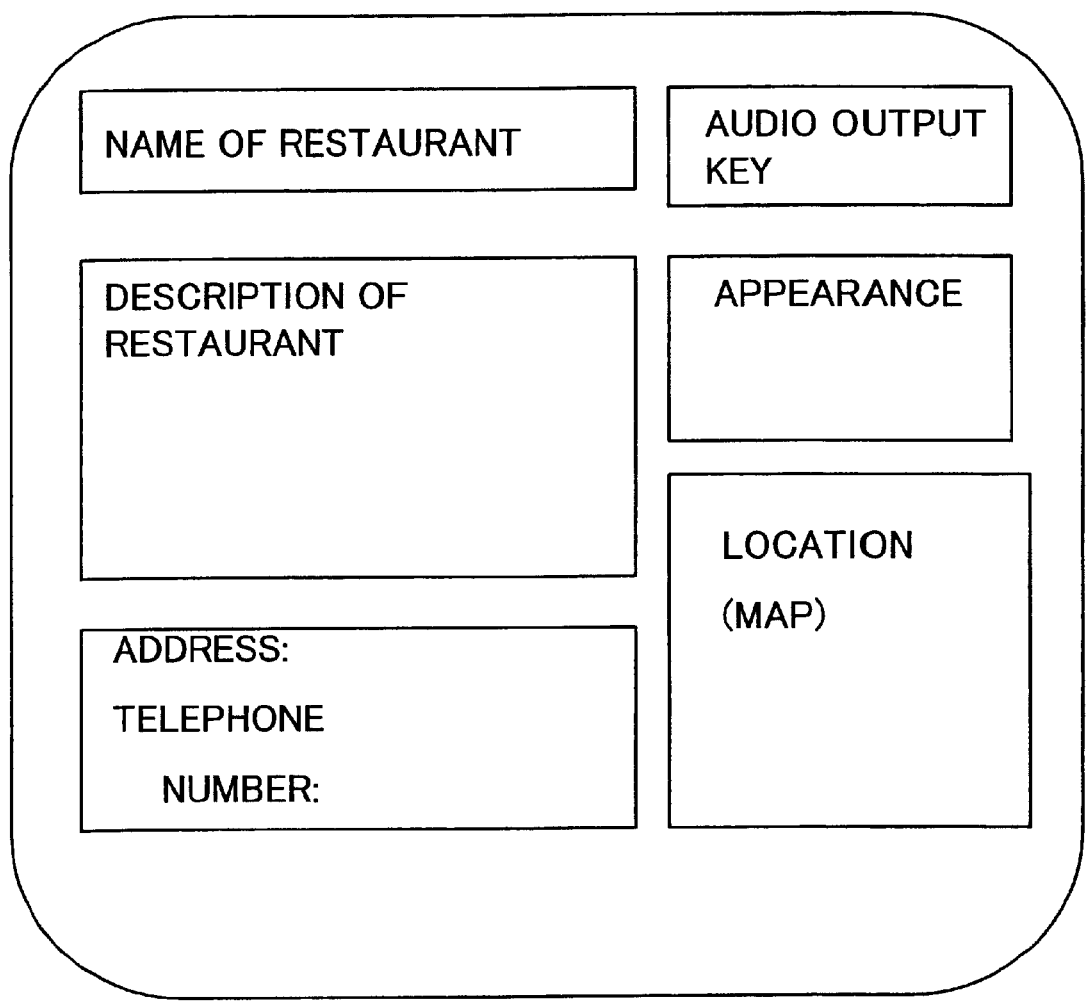
FIG. 8 schematically shows an example of a display presenting the obtained information at a vehicle.

Steps to be taken according to the information transmission method of this embodiment will next be described with reference to the flowchart shown in FIG. 7. The database 22 in this embodiment includes a plurality of databases, which are described as being stored in disk devices physically different from each other.

When a search request, i. e. a request for transmission of information, is made from a vehicle, the information providing center 1 receives the search request (step 401), analyzes the request to decide which database should be accessed (step 402). When it is determined as a result of analysis that more than one database should be accessed, the databases are divided into units (steps 403 and 404). For instance, if a request is made to search for "restaurants near a station A", information on restaurants of various types, such as Japanese, Italian, and Chinese cuisines, in areas surrounding the station must be retrieved. In this case, commonly, databases are accessed on the basis of area or style. However, since the search unit 24 already knows which database stores which information, it divides the content of the search request into units based on the databases.

Since the operations after such division into units are the same as those in the third embodiment described above, namely, information is retrieved based on units and the search result is transmitted, their description will not be repeated.

As described above, according to this embodiment, overhead due to switching of databases during search operations can be reduced, whereby the overall processing time for search operations at the information providing center 1 is shortened. Consequently, the wait for information at the vehicle after request is made is decreased, to thereby prevent as much as possible creating a feeling of being kept waiting.

A characteristic feature of this embodiment lies in that the client is not made to feel that he/she is kept waiting by reducing the time required to access the databases. Therefore, division into unit should be made in an optimum manner depending on specification, design, or the like of databases. For example, it is preferable to take into consideration various factors of disk devices, the number of accesses made to the databases (software), keyword search, and the like.

While the description above refers only to the database 22 possessed by the information providing center 1, the same applies to the external database 222. Especially when an access must be made through a channel or made to paid databases, various costs including channel fee can be reduced according to this embodiment.

While the information communication method according to the present invention has been described in the context of information provision service to vehicles, it should be understood that the present invention can equally be applied to general client-server systems.

What is claimed is:

1. An information transmission method for a server to transmit to a client an information transmission, comprising:

receiving a request from the client;

generating a response to the request;

identifying types of data in the response, the types of data include at least a data description and a data length;

obtaining the amount of transmitted data for each data type in the response;

controlling the order of data transmission based on the obtained amount of transmitted data for each data type; and transmitting the response in the data transmission order determined by the controlling of the order of data transmission.

2. An information transmission method for an information providing center to transmit to a vehicle an information transmission, comprising:

receiving a request from the vehicle;

generating a response to the request;

identifying the type of data in the response;

obtaining the amount of transmitted data for each data type in the response, the types of data include at least a data description and a data length;

obtaining the amount of transmitted data for each data type in the response;

controlling the order of data transmission based on the obtained amount of transmitted data for each data type; and transmitting the response in the data transmission order determined by the controlling of the order of data transmission.

3. The information transmission method according to claim 1 or 2, wherein the controlling the order of data transmission includes sequentially arranging data in an ascending order of data amount so that the data type having the smallest data amount is put first.

4. The information transmission method according to claim 1 or 2, wherein controlling the order of data transmission includes sequentially arranging data of a type in an ascending order of data amount so that data with the smallest amount is put first among the data of the type when a plurality of data items are included in the data type.

5. The information transmission method according to claim 1 or 2, further comprising:

dividing search results into units when a plurality of search results are included in the response, wherein controlling the order of data transmission includes determining the data transmission order for each unit.

6. The information transmission method according to claim 1 or 2, wherein controlling the order of data transmission includes dividing search operations into groups based on databases to control the order of data transmission for each group when it is determined that more than one database should be searched to obtain information for the response.

7. An information transmission device used by a server to transmit to a client an information transmission, comprising:

a device configured to receive a request from the client;

a device configured to generate a response to the request;

a device configured to identify the types of data in the response, the types of data include at least a data description and a data length;

a device configured to obtain the amount of transmitted data for each of the data types in the response;

a controller configured to control the order of data transmission based on the obtained amount of transmitted data for each data type; and a transmitter configured to transmit the response in the data transmission order determined by said controller.

8. An information transmission device used by an information providing center to transmit to a client an information transmission, comprising:

a device configured to receive a request from a client;

a device configured to generate a response to the request;

a device configured to identify the types of data in the response, the types of data include at least a data description and a data length;

a device configured to obtain the amount of transmitted data for each of the data types in the response;

a controller configured to control the order of data transmission based on the obtained amount of transmitted data for each data type; and a transmitter configured to transmit the response in the data transmission order determined by said controller.

9. The information transmission device according to claim 7 or 8, wherein said controller sequentially arranges data in an ascending order of data amount so that the data type having the smallest data amount is put first.

10. The information transmission device according to claim 7 or 8, wherein said controller sequentially arranges data of a type in an ascending order of data amount so that data with the smallest amount is put first in order among the data of the type when a plurality of data items are included in the data type.

11. The information transmission device according to claim 7 or 8, further comprising:

a divider configured to divide search results into units when more than one search result is included in the response, wherein said controller determines the data transmission order for each unit.

12. The information transmission device according to claim 7 or 8, wherein said controller divides search operations into groups based on databases to control the data transmission order for each group when it is determined that more than one database should be searched to provide a response.

* * * * *